United States Patent [19]

Kolkebeck et al.

[11] Patent Number: 4,770,035
[45] Date of Patent: Sep. 13, 1988

[54] AIRFLOW MEASUREMENT UTILIZING VORTEX SHEDDING

[75] Inventors: Kenneth W. Kolkebeck; Thomas A. Mans, both of Harrington Park, N.J.

[73] Assignee: Tek-Air Systems, Inc., Northvale, N.J.

[21] Appl. No.: 4,165

[22] Filed: Jan. 15, 1987

[51] Int. Cl.[4] .............................................. G01F 1/32
[52] U.S. Cl. .................................... 73/195; 73/861.22
[58] Field of Search ........... 73/861.22, 861.23, 861.24, 73/195

[56] References Cited

U.S. PATENT DOCUMENTS

| | | | |
|---|---|---|---|
| 2,869,366 | 1/1959 | Nitikman | 73/861.22 |
| 3,166,639 | 1/1964 | Bird | 73/861.24 |
| 3,650,152 | 3/1972 | White | 73/861.22 |
| 3,719,073 | 3/1973 | Mahon | 73/861.22 |
| 4,161,878 | 7/1979 | Fussell, Jr. | 73/861.24 |
| 4,173,143 | 11/1979 | Venton-Walters | 73/861.22 |
| 4,375,769 | 3/1983 | Brandt, Jr. | 73/861.66 |
| 4,432,241 | 2/1984 | Kita | 73/861.22 |
| 4,440,027 | 4/1984 | Focht | 73/861.24 |
| 4,470,310 | 9/1984 | Tsuruoka | 73/861.24 |
| 4,599,895 | 7/1986 | Wiseman | 73/204 |

FOREIGN PATENT DOCUMENTS 2129142  5/1984  United Kingdom ............ 73/861.22

Primary Examiner—Herbert Goldstein
Attorney, Agent, or Firm—Samuelson & Jacob

[57] ABSTRACT

Method and apparatus for measuring airflow in a duct utilizing the technique of vortex shedding include inducing the shedding of vortices at a frequency within the range of sound, sensing the sounds generated by the shedding of vortices to determine the frequency of vortex shedding, and converting the frequency of vortex shedding into information indicative of airflow measurements.

5 Claims, 3 Drawing Sheets

AIRFLOW MEASUREMENT UTILIZING VORTEX SHEDDING

The present invention relates generally to the measurement of the flow of gases in various systems and pertains, more particularly, to airflow measurement in ducts, and specifically to method and apparatus for measuring airflow in ducts of relatively large cross-sectional area for the purpose of control, such as in heating, ventilating and air conditioning systems, utilizing the principles of vortex shedding.

In systems where air is moved by a fan through ducts, often there is a need to measure air velocity and flow rate. Whether for the purpose of comfort control as in buildings, for combustion control for boilers, or for control in other systems, accurate airflow measurement often is required. Current technology is hardly different from the technology prevalent at about the turn of the century. The technology is centered about the use of a primary device for which a differential pressure versus flow relationship is known to be true. For airflow measurement in ducts the primary device most used today is the pitot tube.

Before proceeding with a detailed description of the present invention, it will be helpful to discuss briefly pitot tube technology as applied in the measurement of airflow in ventilating ducts. The discussion will provide background enabling a better understanding of how the present invention constitutes an advancement in the art of airflow measurement.

A pitot tube consists of a tube which is positioned parallel to the direction of airflow and has an open end upon which the moving air impinges. A measurement is made of the pressure with which the air impacts the tube. This pressure is called the velocity pressure, if the airflow is measured at ambient (atmospheric) pressure conditions. Where the airflow is being measured at a background (static) pressure other than atmospheric, the measured pressure is called the total pressure. In such a case the static pressure must also be measured so that it can be subtracted from the total pressure to arrive at the velocity pressure.

The measured velocity pressure is related to the flow velocity by a mathematical formula which is well known to those who use pitot tubes for this purpose, namely:

$$\text{Velocity (ft./min.)} = 1097 \sqrt{\frac{\text{Velocity pressure (in. } wc)}{\text{Air density (lbs./cu. ft.)}}}$$

Three problems are created by the above relationship. One problem is associated with the fact that the velocity is proportional to the square root of the velocity pressure. This dictates linearization is required if the signal generated by the flowmeter is to represent velocity.

The second problem is the effect air density has on the differential pressure velocity relationship. To determine the flow velocity with any degree of accuracy, both the temperature and the pressure of the air must be measured and used to compute the actual density of the air at flowing conditions.

The third problem stems from the fact that the actual differential pressure measured at low flow rates is of little practical value because it is so small. Modern, economical differential pressure instruments for use in field conditions (as opposed to laboratory conditions) are capable only of measuring differentials of a hundredth of an inch or larger. Even the best of these instruments suffers from inaccuracies associated with instability due to temperature changes, vibration, and drift in electronic and mechanical components. These inaccuracies limit the practical lower limit at which velocity can be measured accurately to about 700 FPM.

Because of the large size of most ducts, it is important to measure the flow velocity across the area of the duct. To accomplish this, many pitot tubes are assembled in an array and individually measured pressures are averaged in a common manifold. Likewise, the static pressure is sensed by multiple static pressure measurement probes and are averaged in a common static pressure manifold. The velocity pressure is determined by measuring the pressure difference between these two manifolds. Since the air traveling in a duct is very turbulent, often it is desirable to place a honeycomb section of flow straighteners upstream of the pitot tube array. These devices add to the cost of making the measurement and increase the pressure losses in the duct. Also, because the averaging which takes place in the manifolds is a pressure average (rather than a velocity average) further errors are introduced if the velocity profile is not uniform.

Pitot tubes and differential pressure measuring devices have gained wide acceptance, in spite of their shortcomings, for many reasons. These reasons include: duct devices are simple to manufacture; duct devices are maintenance free; duct devices require no calibration per se; differential measurement equipment is relatively inexpensive to purchase; and differential measurement equipment is simple to maintain and service.

Pitot tube arrays have serious shortcomings for measuring airflow in ducts. In summary, these shortcomings include: square root effect limits range of operation; low differentials limit minimum measureable flow to 700 FPM; changes in air temperature and pressure affect accuracy of velocity vs. velocity pressure relationship; averaging velocity pressures only approximates the averaging of air velocities in a duct; and differential pressure measuring transducers are analog devices and therefore become less accurate at inputs less than full scale.

Another method of measuring airflow in ducts currently is gaining acceptance in industry. Devices utilizing multiple thermal anemometers, mounted in arrays, are being marketed by a number of manufacturers. These units all operate on essentially the same principle. A temperature sensor, usually a variable resistance type sensor, is fed a current which causes the sensor to self heat. The current required to maintain a fixed differential temperature above ambient is measured and relates to the velocity of the flow. The velocity vs. output relationship is logarithmic and therefore requires linearization before sensor outputs can be added together. Additionally, changes in the density and specific heat of the air will cause changes in the output at the same velocity. Like pitot tubes, thermal anemometers offer little by way of technical benefits when compared to vortex shedding techniques.

The present invention utilizes the principle of vortex shedding to measure airflow. Flow velocity is determined by measuring the frequency with which eddy currents are spun off an obstruction in the flow stream. Vortex shedding techniques have been used with great success in the measurement of the flow of various fluids in pipes. To date, the use of vortex shedding for the measurement of airflow generally has been limited to round ducts up to eight inches in diameter. For a variety of technical reasons, the present invention enables vortex shedding to become a viable and economical method and means for measuring airflow in ducts of larger cross-sectional area for the first time.

The principles of vortex shedding are described as follows: When an obstruction is placed in a flowing fluid, eddy currents are generated and then shed alternately from the sides of the obstruction. These eddies, or vortex trails, can be observed, for example, behind rocks in a swift flowing stream of water. Such vortex trails are called Karman vortices after the person who first quantified the phenomenon. When these vortex trails are generated in a stable pattern the following relationship holds:

$$f = St \times v/d$$

where f is the frequency of vortex shedding, v is the fluid velocity, d is the width of the obstruction, and St is a dimensionless number called the Strouhal Number. The Strouhal Number is of importance in a vortex flowmeter because it defines the region of operation where the vortex frequency is directly proportional to the flow velocity. For most applications, this linear region is between a Reynolds Number of 1000 and 500,000. Using a one inch pipe with a circular vortex shedding element across its center, the anticipated air flow velocities for which stable vortices are generated are well within the range of those found in most ducts; that is, 400 to 4000 FPM. Additionally, this frequency vs. velocity relationship is not affected by the density of air, as is the case in pitot static type measurements. Temperature and pressure are eliminated from interfering in the measurement of actual airflow velocity.

Many studies have been made on the ideal shape of a vortex shedding obstruction. Several shapes have been described in the patent literature. The most common shape in current use is a trapezoidal shape employed in many vortex shedding flowmeters manufactured for industry.

Measuring the frequency of vortex shedding is the most difficult aspect of utilizing this physical phenomenon for air velocity measurements. Many techniques currently are utilized for this purpose in commercially available flowmeters. These techniques include: pressure sensing utilizing capacitance; pressure sensing utilizing a piezo electric element; velocity sensing utilizing heating thermistors; velocity sensing utilizing ultrasonics; stress sensing utilizing a piezo electric element; and strain sensing utilizing strain gauges.

Each of the above techniques has found a place in the industrial flowmeter market where a shedding element is used in a pipe. Typically, the fluid measured has a density many times greater than that of air at the conditions found in ventilating ducts. This higher density allows the use of less sensitive, but very rugged sensors. These sensing methods often are too expensive to consider in duct airflow applications. They also are insensitive to vortex shedding at the lower velocities which are found in ventilating ducts. In spite of the fact that vortex shedding actually takes place at low airflow velocities in ducts, to date, sensing of the vortex frequency has been difficult. In order to utilize vortex shedding in the measurement of low airflow velocities, a new, more sensitive sensing technique is required.

The above discussion points out that vortex shedding techniques provide many advantages over conventional techniques. Among these advantages are: linear airflow velocity vs. frequency relationship; wide range of operation; insensitivity to temperature and pressure; frequency vs. velocity relationship fixed by geometry; vortex shedders require no calibration per se; vortex shedder itself is maintenance free.

However, prior to the present invention, no inexpensive, yet reliable method existed for measuring the frequency at which vortices are shed. This fact, more than any other, prevented vortex shedding from being considered as a commercially viable method for measuring air velocity in ducts.

It is an object of the present invention to provide method and apparatus by which the above-outlined advantages of vortex shedding techniques are attained in the measurement of airflow in systems utilizing ducts of relatively large cross-sectional area. Further, the method and apparatus of the present invention fulfills additional objects and advantages, as follows: effective operation within the range of airflow measurements required in the systems within which the method and apparatus is to be used, namely, within airflow rates of about 400 to 4000 FPM; immunity to the effects of extraneous "noise" encountered in field conditions, such as the effects of vibration, temperature and other conditions encountered in ducts; ease of installation, calibration and use; reliability in providing accurate results over a long service life; simplicity in design for inexpensive manufacture and widespread utility.

The above objects, as well as further objects and advantages are attained by the present invention which may be described briefly as method and apparatus for measuring airflow in a duct, utilizing the technique of vortex shedding, the method and apparatus comprising the step of and means for inducing the shedding of vortices at a frequency within the range of sound, the step of and means for sensing the sounds generated by the shedding of vortices to determine the frequency of vortex shedding and the step of and means for converting the determined frequency of vortex shedding to airflow measurements.

The invention will be understood more fully, while still further objects and advantages will become apparent, in the following detailed description of a preferred embodiment of the invention illustrated in the accompanying drawing, in which.

Figure 1:
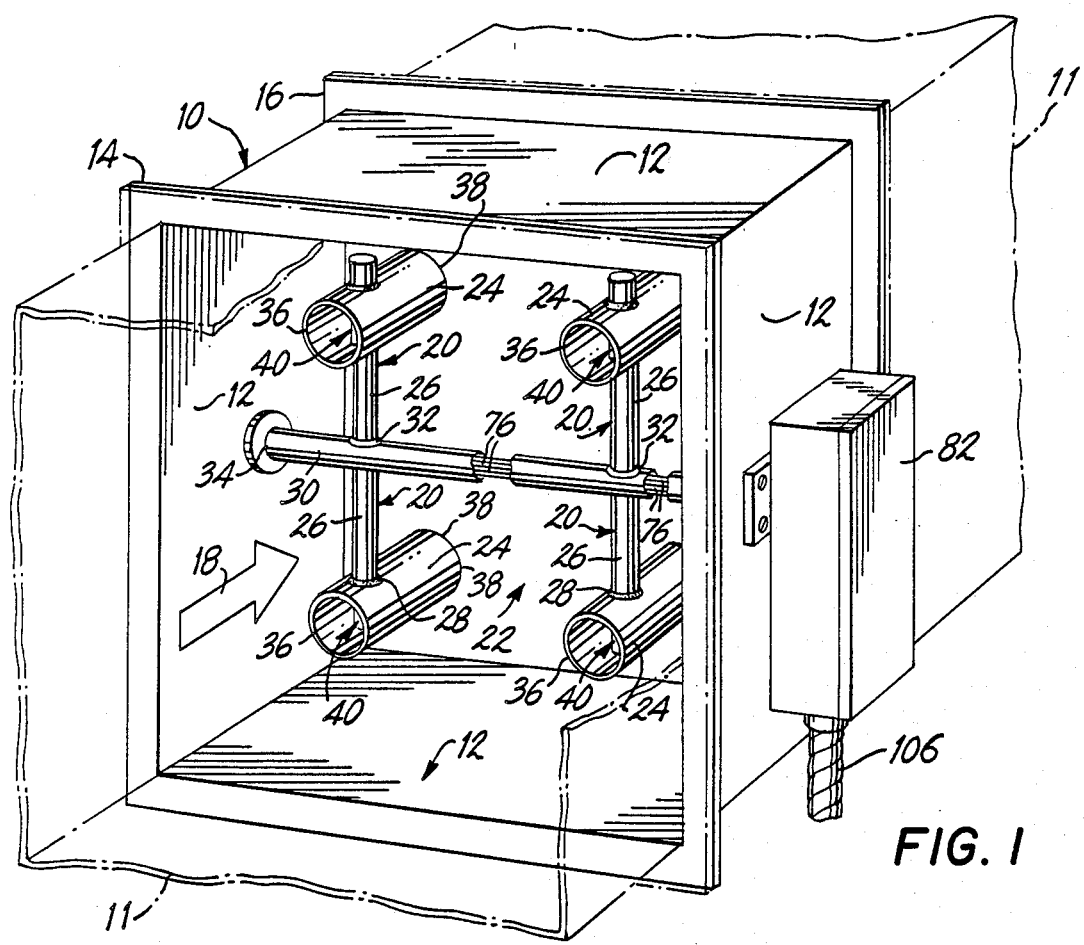
FIG. 1 is a perspective view of a section of a duct within which is installed apparatus constructed in accordance with the present invention.

Referring now to the drawing, and especially to FIG. 1 thereof, a duct section 10 is placed within a typicl duct 11 (shown in phantom) in an air-handling system, such as found in a heating, ventilating and air conditioning system of a building. Duct section 10 has a rectangular cross-sectional configuration defined by side walls 12, and includes a forward flange 14 at the forward end of duct section 10 and a rearward flange 16 at the rearward end of duct section 10 for facilitating the placement of duct section 10 within the duct 11 of the air-handling system. The method and apparatus of the present invention measures airflow velocity of the air flowing from the forward end toward the rearward end of duct section 10, that is, in the direction of arrow 18, and includes a plurality of probes 20 arranged in an array 22 placed within the stream of air flowing through duct section 10.

Each probe 20 includes a tubular shroud 24 affixed to a tubular stem 26, as by a soldered connection at 28. Each tubular stem 26, in turn, is affixed to a support tube 30, as by a soldered connection at 32. The support tube 30 extends across the duct section 10 and is anchored at each end 34 to a corresponding side wall 12 (also see FIG. 5). The illustrated array 22 includes four probes 20 located throughout the cross-sectional area of duct section 10; however, a greater or lesser number of probes 20 may be utilized, as required for a particular installation. Each shroud 24 includes an inlet end 36 facing upstream and an outlet end 38 facing downstream.

Figure 2:
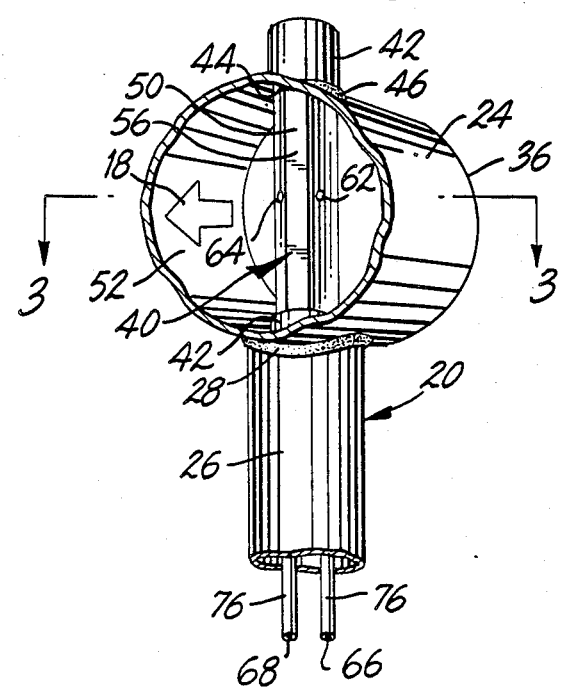
FIG. 2 is a perspective view of a probe assembly of the apparatus of FIG. 1.

Turning now to FIG. 2, a shedder bar 40 is placed within the shroud 24 of each probe 20. Shedder bar 40 includes a cylindrical flange 42 at either end thereof and each cylindrical flange 42 is received within a complementary aperture 44 (see FIG. 3) in shroud 24 to locate shedder bar 40 within the shroud 24 such that the shedder bar 40 extends along a diameter of the shroud 24. Shedder br 40 is secured in place, preferably by a soldered connection at 46. A vortex-shedding segment 50 of shedder bar 40 is located between the cylindrical flanges 42 and extends essentially across the passage 52 defined by the interior of shroud 24.

Figure 3:
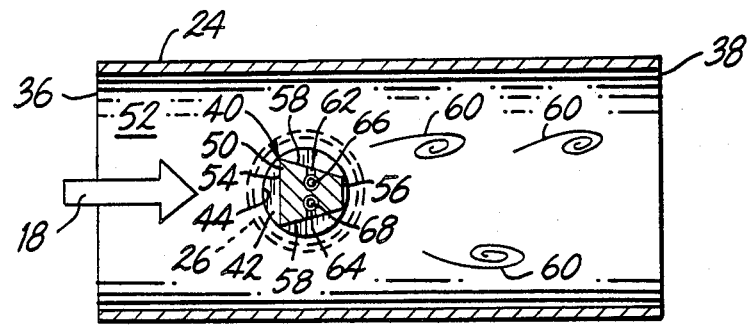
FIG. 3 is a cross-sectional view taken along line 3—3 of FIG. 2, with the addition of diagrammatic illustrations.

As best seen in FIG. 3, segment 50 has a trapezoidal cross-sectional configuration including a larger width face 54 facing upstream, a smaller width face 56 facing downstream and opposite sides 58 converging from the larger width face 54 toward the smaller width face 56. The trapezoidal cross-sectional configuration of vortex-shedding segment 50, thus placed in the airstream within the passage 52, induces the generation of vortices 60 which are shed alternately from the sides 58 of segment 50, in a pattern illustrated diagrammatically in FIG. 3. The frequency of this vortex shedding is related to the velocity of the airstream by the mathematical relationship outlined above. Therefore, by sensing the frequency of vortex shedding, measurement of the airstream velocity is attained. It has been found that by an appropriate choice of dimensions, the frequency of vortex shedding, over the range of airstream velocities to be measured, can be made to fall within a range of sound frequencies. Thus, by utilizing a shroud 24 having an inside passage 52 with a diameter of about one inch and a shedder bar 40 having a vortex-shedding segment 50 with a larger width face 54 of one-quarter inch width, airstream velocities in the range of 400 to 4000 FPM generate vortex shedding frequencies in the range of about 60 to 6000 Hz. Since these frequencies lie within the audible range, sensing of the vortex shedding frequency is accomplished through the use of a simple microphone.

While acceptable results have been obtained utilizing a single microphone placed either in the shedder bar or in the shroud to sense the frequency of vortex shedding, it has been found advantageous to remove the microphone to a remote location and then couple the microphone acoustically with the passage in the shroud for sensing the vortex shedding frequency. In this manner, the microphone is removed from the vicinity of the airstream and any deleterious effects of temperature, humidity, extraneous matter or vibration present in that vicinity. In addition, removal of the microphone to a remote location enables the sensing site itself to be made smaller and more compact, since the microphone need not be accommodated at that site.

A major problem encountered in determining the vortex shedding frequency by sensing the sound generated by vortex shedding is that other sounds generated in the vicinity of the microphone could cause errors in the output of the apparatus. Thus, while the sounds generated by vortex shedding are "loud" enough at high flow conditions to overcome noises generated by fans in the duct or by other machine noise or by talk among people in the vicinity of the duct, at low flow conditions the sounds generated by vortex shedding are relatively "soft" and, by virtue of a low signal-to-noise ratio, such noises could cause errors in the output of the apparatus. The problem is eliminated by employing two microphones, one which listens to the combined sound of vortex shedding and the unwanted noise and one which listens only to the unwanted noise. The outputs of the two microphones then are subtracted electrically so that the signal common to both (the unwanted noise) is deleted, leaving only the sounds of vortex shedding. In a similar manner, currently available "noise-cancelling" microphones may be employed to eliminate unwanted ambient noise.

Figure 4:
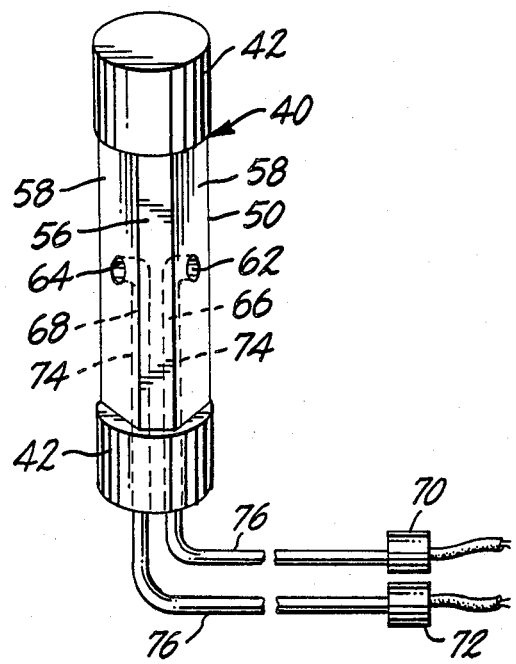
FIG. 4 is a pictorial illustration of a shedder bar of the apparatus.

In the configuration of the illustrated embodiment, two remote microphones are utilized, each coupled acoustically to one side 58 of the shedder bar 40. Referring to FIG. 4, as well as to FIGS. 2 and 3, opposite ports 62 and 64 are located in the sides 58 of vortex-shedding segment 50 of shedder bar 40. Hollow conduits 66 and 68 acoustically couple each port 62 and 64 with a corresponding remote microphone 70 and 72. Conduits 66 and 68 each include a passage 74 within the shedder bar 40, and a sound tube 76. As illustrated in FIG. 3, the vortex shedding sounds at each side 58 of the vortex shedding segment 50 are 180 degrees out of phase with one another; hence, upon subtraction of the signal derived from one of the microphones 70 and 72 from the signal derived from the other of the microphones 70 and 72, the signals corresponding to the ambient noises sensed by each microphone are in phase and are deleted, while the out-of-phase signals corresponding to the vortex shedding sounds are retained.

Figure 5:
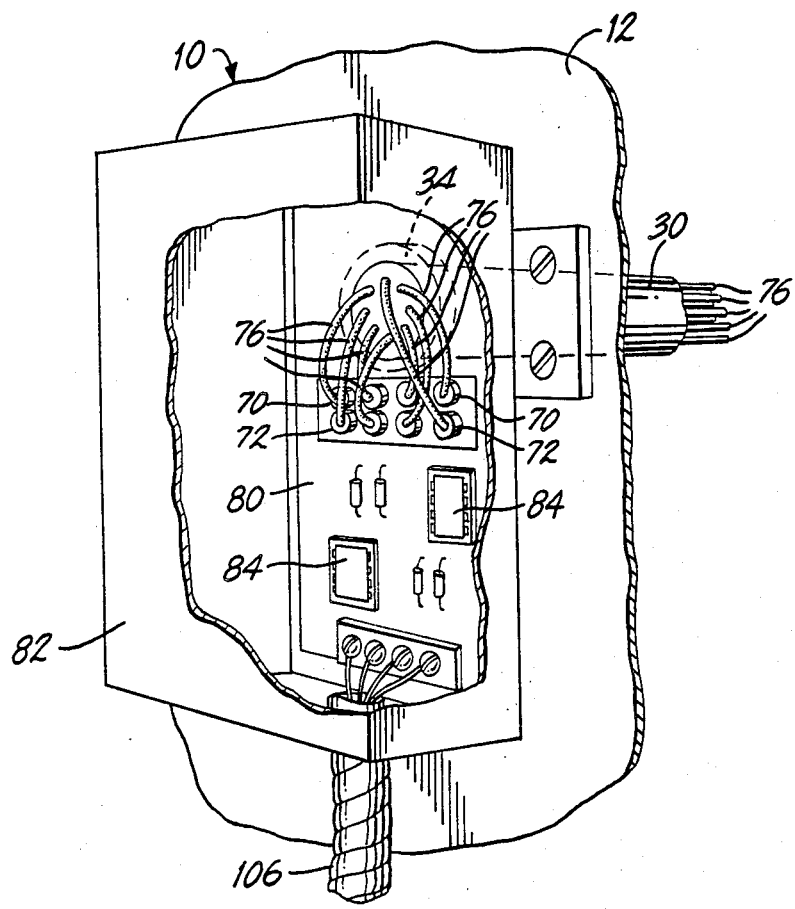
FIG. 5 is a pictorial illustration of the information processing arrangement of the apparatus.

Turning now to FIG. 5, as well as to FIG. 1, the sound tubes 76 are threaded through each stem 26 of each probe 20 and pass through support tube 30 to be routed to corresponding microphones 70 and 72 which are mounted upon a remote circuit board 80 placed within a housing 82 secured to a side wall 12 of duct section 10. Thus, each port 62 and 64 of each shedder bar 40 is acoustically coupled to a respective microphone 70 and 72 by a corresponding conduit 66 and 68. The circuit board 80 is a part of a processing arrangement which includes electronic components 84 responsive to the output of the microphones to provide the desired information pertaining to airflow, as follows.

Figure 6:
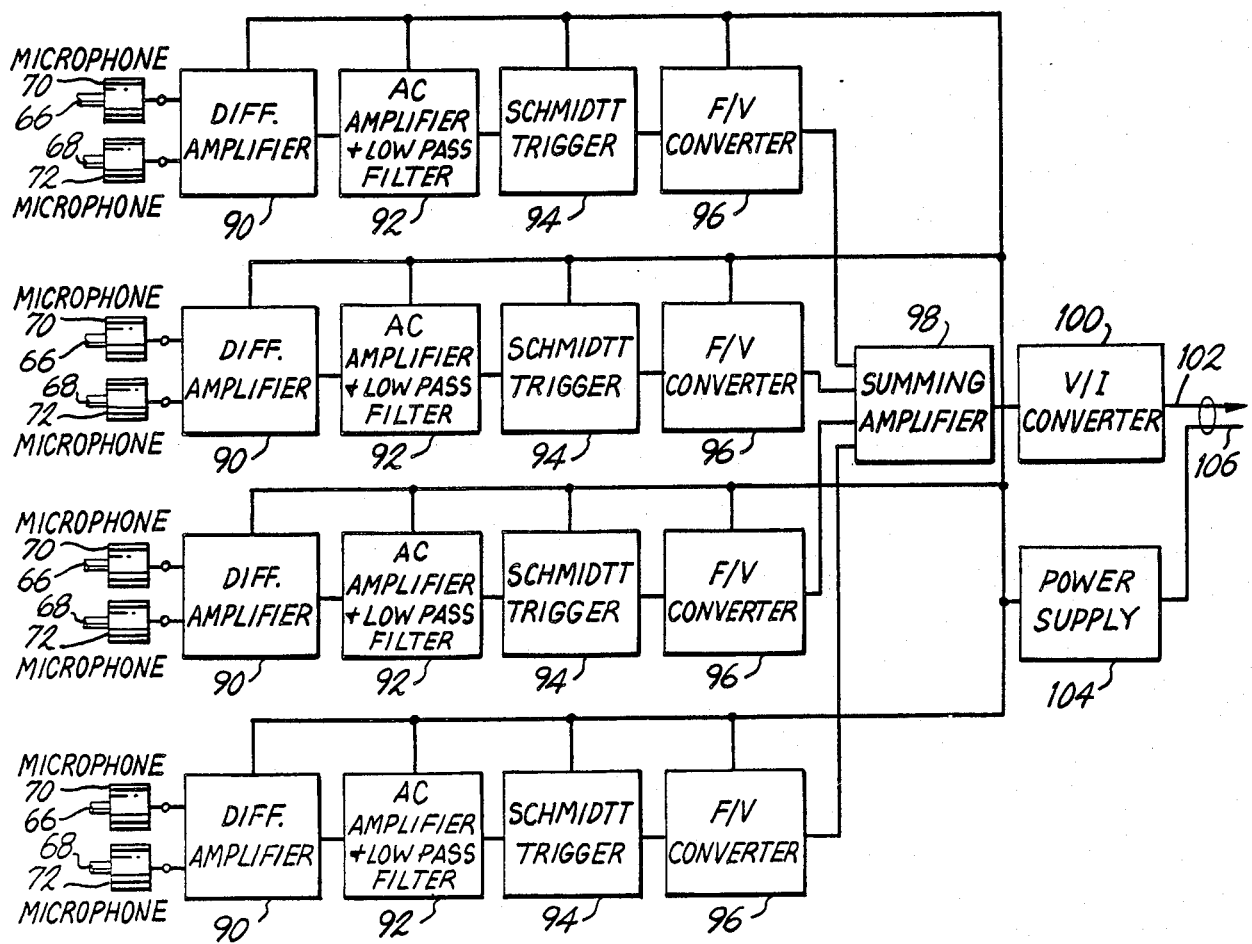
FIG. 6 is a block diagram of the information processing arrangement.

Most controllers, indicators and energy management systems which utilize air velocity measurements require an input in the form of an analog electronic signal. Each of the probes 20 of the present invention generates a frequency (or pulse) output. However, the art of frequency to analog conversion is quite well developed and it becomes a relatively simple matter to convert the output of microphones 70 and 72 to the desired analog information signal. Referring now to FIG. 6, the sounds generated by the shedding of vortices at the vortex-shedding segment 50 of a shedder bar 40 are transmitted to corresponding microphones 70 and 72, via conduits 66 and 68, where the sounds are converted to electrical signals forwarded to a differential amplifier 90 which subtracts the output of one microphone from that of the other to delete ambient noise, as explained above. The resulting signal which provides information indicative of the frequency of vortex shedding, is passed to an AC amplifier and low pass filter 92 which amplifies the information signal provided by the microphones, through the differential amplifier, and rejects extraneous high frequency noise. A Schmidtt trigger 94 then converts the resulting vortex frequency AC voltage to a constant signal level, providing some hysteresis in order to prevent false triggering due to noise. A frequency to voltage converter 96 then provides a DC voltage which corresponds to the vortex frequency.

The DC voltage derived from each probe 20 and the related components is directed to a summing amplifier 98 which adds the output signals from the individual frequency to voltage converters 96 and provides an output voltage proportional to the sum of the input voltages. That output voltage is fed to a voltage to current converter 100 which provides a DC current signal at 102 proportional to the input to the voltage to current converter. The DC current signal is indicative of the desired airflow and conforms to the industry standard for analog transmission of flow velocity signals. The processing arrangement is powered by a power supply 104 which is connected to a power source through a cable 106. Cable 106 includes conductors for transmitting the output of the processing arrangement.

It is noted that the formula relating velocity to frequency of vortex shedding, as previously mentioned, shows that the width of the obstruction, or the vortex shedder bar, is inversely proportional to the frequency of vortex shedding at a given flow rate. This places practical limits on the size of the obstruction to be placed in the duct. Furthermore, the ratio of the width of the vortex shedder bar to the width of the duct is important in creating strong, stable vortices. As a result, it is not practical to utilize large obstructions in large ducts because the frequency of the vortices thus generated is too low (cycles per minute rather than cycles per second) to be of significant value. Accordingly, the illustrated embodiment utilizes small obstructions placed in smaller diameter tubes (shrouds 24) within the larger duct. Thus, while duct section 10 has a relatively large cross-sectional area of about twelve inches by twelve inches, probes 20 include passages 52 of relatively small cross-sectional area defined by the one inch diameter of shrouds 24. Like the pitot array, an array 22 of vortex shedding velocity probes 20 blankets the cross-sectional area of the duct section 10. By averaging the frequencies of all of the vortex shedder bars 40 the average velocity is determined. Probe placement is determined by partitioning the duct section into equal area portions and locating a probe in the center of each portion.

It is apparent that the above-described method and apparatus provide a very simple, yet highly effective arrangement for measuring airflow in ducts. The method is adapted easily to a variety of installations and provides reliable results in many different operating environments. The apparatus is rugged nd requires little attention once installed. Installation and calibration are easily accomplished and once installed, the apparatus provides reliable results over a long service life.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. Apparatus for measuring a relatively low velocity airflow in a duct having a relatively large cross-sectional area, such as encountered in heating, ventilating and air conditioning systems, said apparatus comprising:
   a plurality of vortex shedders arranged in an array within the duct and being spaced apart from one another across the cross-sectional area of the duct for inducing the shedding of vortices at a corresponding plurality of selected locations at a frequencies related to the airflow in the duct;
   a plurality of shrouds in the duct, each shroud being located at a corresponding one of said selected locations in said array such that the shrouds are spaced apart from one another across the cross-sectional area of the duct, a passage within each shroud, one of said plurality of vortex shedders being located in each passage such that the shedding of vortices takes place within the passages provided by the shrouds, each passage having a cross-sectional are much smaller than the cross-sectional area of the duct such that the frequencies of the shedding of vortices are within the range of sound and the sounds generated by the shedding of vortices are generated within said passages, the number and spacing of the shrouds being such that the total cross-sectional area of all of the passages constitutes only a relatively small portion of the cross-sectional area of the duct;
   a sound-sensing location on each vortex shedder;
   a plurality of microphones, each microphone being coupled acoustically with each sound-sensing location so as to sense sounds generated by said shedding of vortices in a corresponding passage and provide an information signal indicative of said vortex shedding sounds; and
   processing means responsive to the information signals from the plurality of microphones for processing the information signals to determine the frequencies of vortex shedding, to convert said frequencies of vortex shedding to further information signals indicative of airflow measurements, and to provide still further information indicative of the airflow throughout the cross-sectional area of the duct.

2. The invention of claim 1 including an extended acoustic conduit between each sound-sensing location and each microphone.

3. The invention of claim 2 wherein each microphone is located outside the duct.

4. The invention of claim 1 including at least one second microphone located so as to sense sounds in the duct other than the sounds generated by the shedding of vortices and providing a noise information signal indicative of said other sounds, and means responsive to the first said information signal and the noise information signal for deleting noise from the further information signals.

5. The invention of claim 4 wherein each vortex shedder includes opposite sides, sound-sensing locations placed one on each of the opposite sides of each vortex shedder, the corresponding first and second microphones each being coupled acoustically to a respective sound-sensing location.

* * * * *